(12) United States Patent  
Schwabe

(10) Patent No.: US 6,717,401 B2
(45) Date of Patent: *Apr. 6, 2004

(54) DRUM-SHAPED MEASURING STANDARD

(75) Inventor: Michael Schwabe, Rimsting (DE)

(73) Assignee: Dr. Johannes Heidenhain GmbH, Traunreut (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,728

(22) Filed: Oct. 14, 1999

(65) Prior Publication Data
US 2003/0052667 A1 Mar. 20, 2003

(30) Foreign Application Priority Data

Oct. 14, 1998 (DE) .......................... 198 47 408
Aug. 4, 1999 (DE) .......................... 199 36 681

(51) Int. Cl.⁷ ................................. G01B 7/30
(52) U.S. Cl. ................. 324/207.22; 324/207.25; 324/174; 29/593
(58) Field of Search ............ 324/207.15, 207.16, 324/207.17, 207.2, 207.21, 207.22, 207.25, 252, 166, 173, 174, 175, 32 H; 338/32 R; 310/168, 156.08, 156.06; 29/593, 607; 341/15; 384/448

(56) References Cited

U.S. PATENT DOCUMENTS

| | | | | |
|---|---|---|---|---|
| 4,049,475 A | * | 9/1977 | Houska | 148/101 |
| 4,366,372 A | * | 12/1982 | Sargent | 235/92 PL |
| 4,695,795 A | * | 9/1987 | Nakamizo et al. | 324/207.15 |
| 4,810,967 A | * | 3/1989 | Yokoyama et al. | 324/207.2 |
| 4,916,390 A | * | 4/1990 | Christoleit et al. | 324/174 |
| 5,015,536 A | * | 5/1991 | Sweet et al. | 428/611 |
| 5,325,055 A | * | 6/1994 | Geringer | 324/173 |
| 5,708,216 A | | 1/1998 | Garshelis | 73/862.335 |
| 5,928,404 A | * | 7/1999 | Parachuri et al. | 75/255 |
| 6,133,730 A | * | 10/2000 | Winn | 324/207.22 |

FOREIGN PATENT DOCUMENTS

| | | |
|---|---|---|
| DE | 41 33 709 | 4/1993 |
| DE | 198 06 917 | 8/1998 |
| EP | 0 624 780 | 5/1994 |
| EP | 0 723 136 | 7/1996 |
| JP | 60 323 | 5/1985 |
| JP | 63-40813 | 2/1988 |
| JP | 2-130418 | 5/1990 |

* cited by examiner

Primary Examiner—Jay Patidar
(74) Attorney, Agent, or Firm—Kenyon & Kenyon

(57) ABSTRACT

A measuring standard to measure the rotational speed of a machine is described. A ring (4) is integrally secured to the periphery (1.1) of a drum-shaped base member (1), by using soldering in accordance with the present invention. Through soldering, a stable measuring standard for an angular-position measuring system is created for high rotational speed applications.

44 Claims, 4 Drawing Sheets

DRUM-SHAPED MEASURING STANDARD

The present invention relates to a measuring standard having a magnetic scale graduation, which is able to be scanned by a magnetic field-sensitive detector to generate positionally dependent sampled signals. The invention also relates to a positional measuring device in which a measuring standard of this kind is used.

DESCRIPTION OF RELATED ART

A measuring standard formed of a base member and of a graduation-scale carrier secured thereto, also having a graduation scale, is used in a position-measuring device for measuring the relative position or the relative speed of two objects, which are movable in relation to one another.

The most common manner of securing a graduation-scale carrier to a base member is by adhesive bonding. European Patent 0 624 780 B1 and U.S. Pat. No. 5,325,055 cite the drawbacks of adhesion, and describe measures for achieving a more stable fastening. European Patent 0 624 780 B1 proposes partially welding the graduation-scale carrier, also known as a scale plate, to the base member. The disadvantage associated with the welding is that very high temperatures act on the graduation-scale carrier, since, for a welded connection it is necessary that material of the graduation-scale carrier be melted over its entire thickness. Since this type of melting can adversely affect the area of the graduation scale, the welding operation must be limited to areas outside of the graduation scale. Generally, only a spot or line-type welding can be implemented relatively simply.

U.S. Pat. No. 5,325,055 relates to the securing of a magnetic ring of magnetizable material to the outer surface of a cylinder block. This reference recognizes that the ring did not sit securely enough during adhesion. To overcome this drawback, it was proposed to provide the magnetic ring with a reinforcement ring. This reinforcement ring is also designed to prevent the ring from becoming partially detached or destroyed at high speeds.

Japanese Patent 2-130418 A proposes heat-shrinking a magnetic ring of magnetizable material onto the outer circumference of a drum base body. This method, however, does not prevent the ring from becoming detached at high rotational speeds.

European Patent 0 723 136 A1 describes winding a band of magnetic material in a helical shape onto the surface area of a drum-shaped rotor.

A ring-shaped scale-graduation carrier of magnetizable material is likewise known from Japanese Patent 63-40813 A. The magnetizable material is a plastically bound magnetic material, which is applied to the periphery of a drum. The application is followed by magnetization of the material. To prevent the plastic material from becoming detached from the drum, a T-slot or dovetailed groove is provided as a keyed connection on the drum's periphery. This measure, however, does not suffice to prevent the relatively elastic plastic material from becoming loose.

To measure linear displacements of a magnetic core element in relation to a coil arrangement, German Patent 198 06 917 A1 describes soldering the core element to a rod.

For a linear measuring device, Japanese Patent 60-323 A describes securing a magnetic wire by soldering it into a groove of a linear carrier member.

German Patent 41 33 709 A1 describes soldering individual pulse generator profiles, which are spaced apart from one another, onto the periphery of a wheel. To produce each pulse used in incremental positional measurements, a separate element in the form of a piece of wire is aligned with the periphery and secured thereto.

U.S. Pat. No. 5,708,216 describes a measuring system for measuring the torque of a shaft. A ring is soldered onto the shaft's periphery. An adjacent toothed disk, or encoder wheel, is provided for measuring speed. This disk is not suited for high speeds of rotation, since it is only secured by the ring to the shaft, and since the teeth of the disk produce an irregular and loud running performance.

SUMMARY OF THE INVENTION

The present invention is a measuring standard and a positional measuring device utilizing such a measuring standard, where the scale-graduation carrier is joined in a stable fashion to the base member, and where the area of the scale-graduation carrier bearing the scale graduation is not adversely affected by the joining process.

In one embodiment, the invention is a measuring standard comprising a drum-shaped base member, a prefabricated ring of a magnetic material having an inner surface area secured to a periphery of the base member by soldering, wherein a soldering material is introduced between the base member and the prefabricated ring. The measuring standard also includes a magnetic pattern arranged on a circular peripheral area of the ring, disposed opposite the soldered inner surface, having a series of alternating portions extending in the circumferential direction of the ring and whose magnetization differs on a portion by portion basis.

In another embodiment, the invention is a positional measuring device comprising a drum-shaped base member, a prefabricated ring having an inner surface area secured to a periphery of the base member by soldering, wherein a soldering material is introduced between the base member and the prefabricated ring, and a magnetic pattern arranged on a circular peripheral area of the ring, disposed opposite the soldered inner surface, having a series of alternating portions extending in the circumferential direction of the ring and whose magnetization differs on a portion by portion basis. The measuring device also has a magnetic field-sensitive scanning unit adjacent to the magnetic pattern, to scan the magnetic pattern and generate at least one electrical, positionally dependent sampled signal as a function of an instantaneous angular position of the base member.

The design of the present invention is advantageous because the scale-graduation carrier can be securely joined in a simple manner to the base member. The present invention can be used quite advantageously to secure a band-shaped or ring-shaped, magnetizable scale-graduation carrier to the periphery of a drum. This system is well suited for use at high speeds of rotation of the drum. With the present invention, the scale-graduation carrier does not become detached from the base member, even at high speeds.

It is to be understood that both the foregoing general description and the following detailed description are exemplary and explanatory and are intended to provide further explanation of the invention as claimed.

BRIEF DESCRIPTION OF THE DRAWINGS

Exemplary embodiments according to the invention are described with reference to the drawings. In the drawings.

DETAILED DESCRIPTION OF THE INVENTION

The invention is a drum-shaped measuring standard, which can be used for measuring the angular position or the speed of high-speed spindles in machine tools.

Figure 1A:
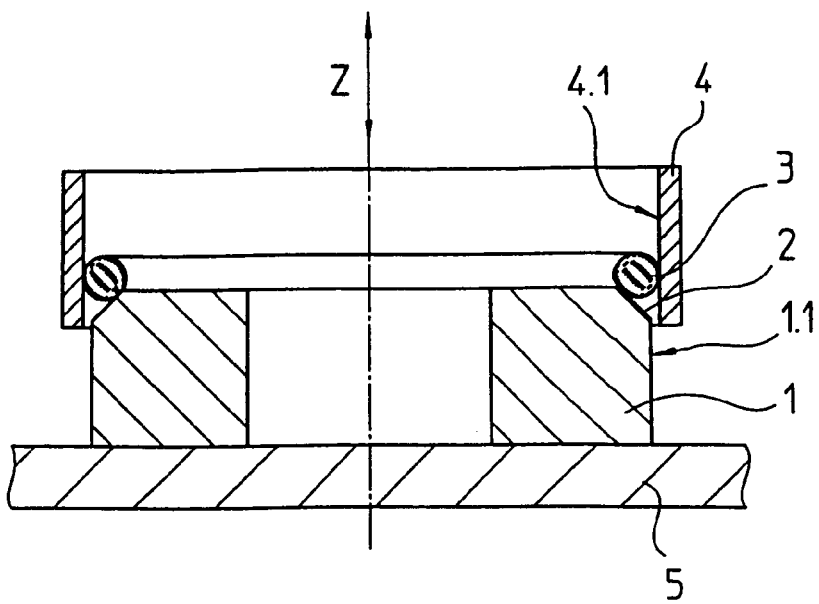
FIGS. 1a, 1b and 1c are diagrams showing the steps for manufacturing a first embodiment of a measuring standard according to the invention.
Figure 1B:
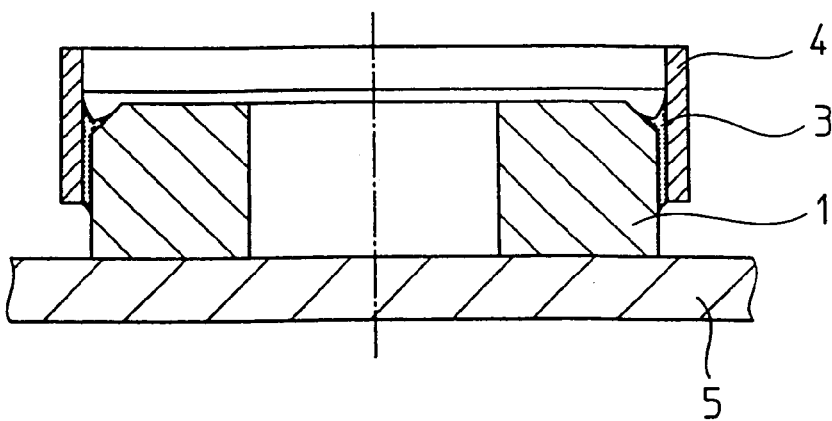
Figure 1C:
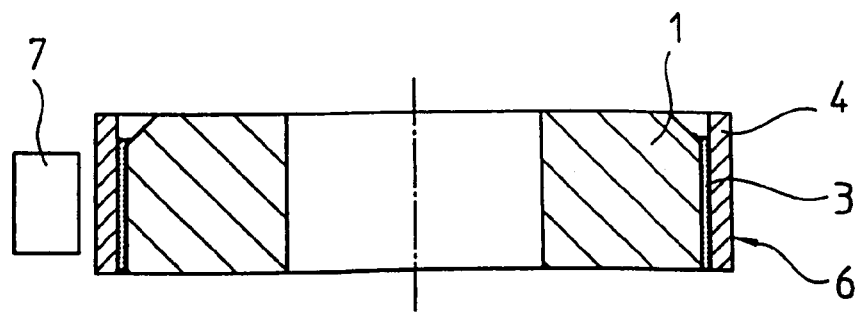
Figure 2:
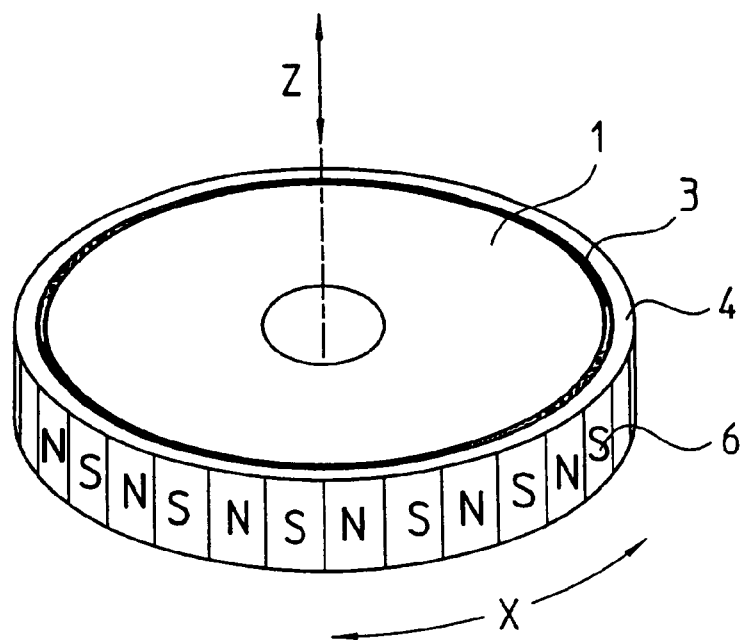
FIG. 2 is a perspective view showing the measuring standard produced in accordance with the first embodiment shown in FIGS. 1a, 1b and 1c.

The most important process steps for manufacturing the measuring standard shown in FIG. 2 are depicted in FIGS. 1a through 1c. A drum-shaped base member 1 is provided with a chamfer 2 running in the circumferential direction X, or with a groove for receiving a bead of solder 3. Solder 3 can be deposited in the form of a ring. A prefabricated, annular graduation-scale carrier ring 4 of magnetizable material is soldered onto base member 1. Solder 3 is molten and, in the process, the two parts 1 and 4 are axially displaced in the Z-direction with respect to one another. While ring 4 is slid onto periphery 1.1 of base member 1, inner peripheral area 4.1 of ring 4 and outer peripheral area 1.1 of base member 1 are fully wetted with liquid solder 3, as schematically shown in FIG. 1b.

In another embodiment, the continuous chamfer 2 can be replaced by chamfered sections spaced along the upper circumferential edge of base member 1, or by a plurality of grooves spaced circumferentially in the X direction around base member 1, and extending in the Z direction. This approach is particularly advantageous when wide base members are used, or when a viscous solder is used.

In this description, soldering is understood to be the integral joining of heated elements, that remain in the solid state, by melting between the elements a fusing material that is generally called solder.

Solder 3 is melted, for example, in a heating oven 5 where base member 1 is heated together with solder 3 and ring 4, until solder 3 becomes liquid and fills the gap between base member 1 and ring 4. In this application, the term soldering is used in a general manner, referring to traditional soldering, brazing, hard-soldering, and other soldering techniques.

After solder 3 cools, a graduated scale 6 is applied to the periphery of ring 4. A write head 7 is utilized to alternately magnetizes the magnetizable material 4 to a north or south polarity along the circumferential direction, in a well-known manner.

As shown in FIG. 1a, a chamfer 2 is applied to base member 1 to receive the solder. A chamfer or groove of this kind can be alternatively or additionally provided on ring 4. Chamfer 2 or the groove on base member 1 and/or on ring 4 forms a pocket for receiving solder 3. Solder 3 is melted, so it is able to flow from the pocket into the gap between base member 1 and ring 4. Thus, pocket 2 is used as a solder reservoir.

In accordance with a first exemplary embodiment of the invention, ring 4 is placed in position during or subsequent to the melting of solder 3.

Figure 3A:
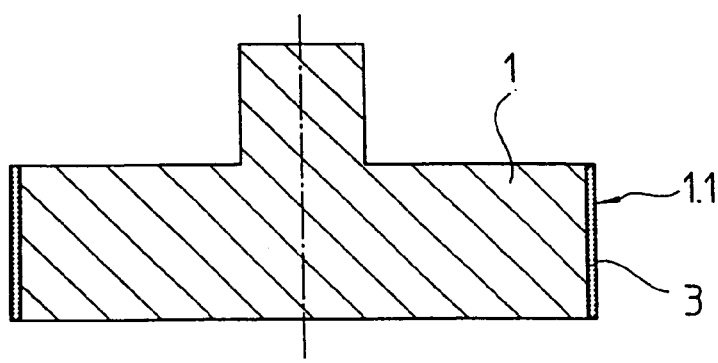
FIGS. 3a and 3b are diagrams showing the steps for manufacturing a second embodiment of a drum-shaped measuring standard.
Figure 3B:
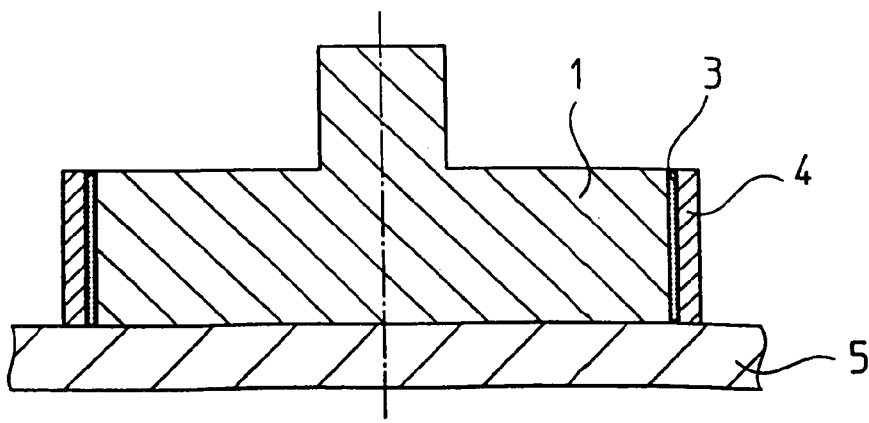

In another embodiment, ring 4 can also be placed in position prior to the melting of solder 3. An example of this process is illustrated in FIGS. 3a and 3b. In this case, solder 3 is first applied to the periphery of drum shaped base member 1. For example, the solder 3 can be coiled as foil around periphery 1.1 or can be applied as a paste. After that, ring 4 of magnetizable material is slid on the base member, and in this joined or assembled position solder 3 is melted when the entire assembly is placed in a heating oven 5.

Ring 4 can be slid in a first step onto base member 1, leaving a gap between outer surface 1.1 of drum 1 and inner surface 4.1 of ring 4 for receiving solder. Solder 3 is first introduced into the gap following this joining operation. Due to the capillary effect, both bonding surfaces 1.1 and 4.1 are wetted quite effectively with solder 3.

Figure 4:
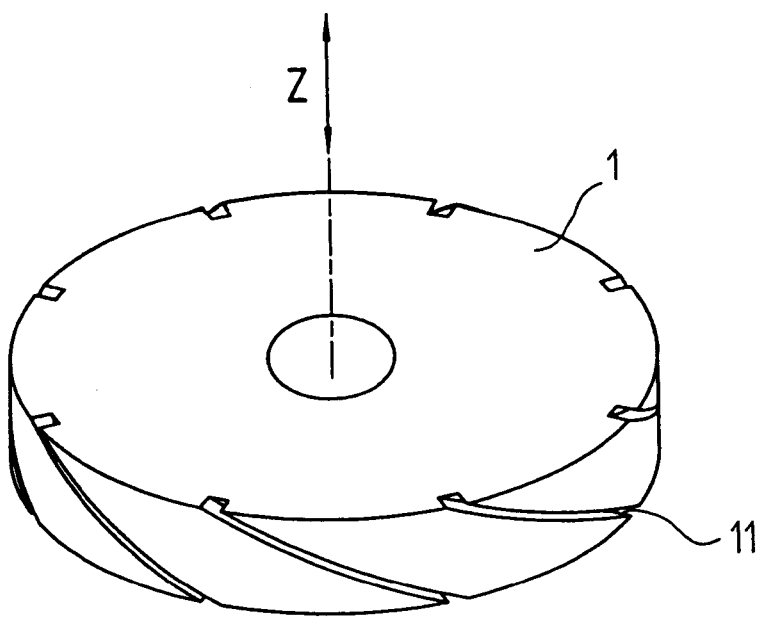
FIG. 4 is a perspective view showing a specially designed base member of a third embodiment of the measuring standard.

In all cases, it can be beneficial to provide channels or grooves 11 on periphery 1.1 of drum 1 and/or on the inner surface 4.1 of ring 4, to guide and receive the solder 3. Spiral-shaped grooves 11 are shown illustratively in FIG. 4. In these grooves 11, solder 3 can be introduced prior to the actual soldering operation—similarly to the process shown in FIG. 3b—or grooves 11 can be used to receive the externally supplied, molten solder 3. If possible, grooves 11 also operate to distribute the solder 3 uniformly. The channels or grooves 8 can also run exclusively in the axial direction Z, as an example.

Figure 5:
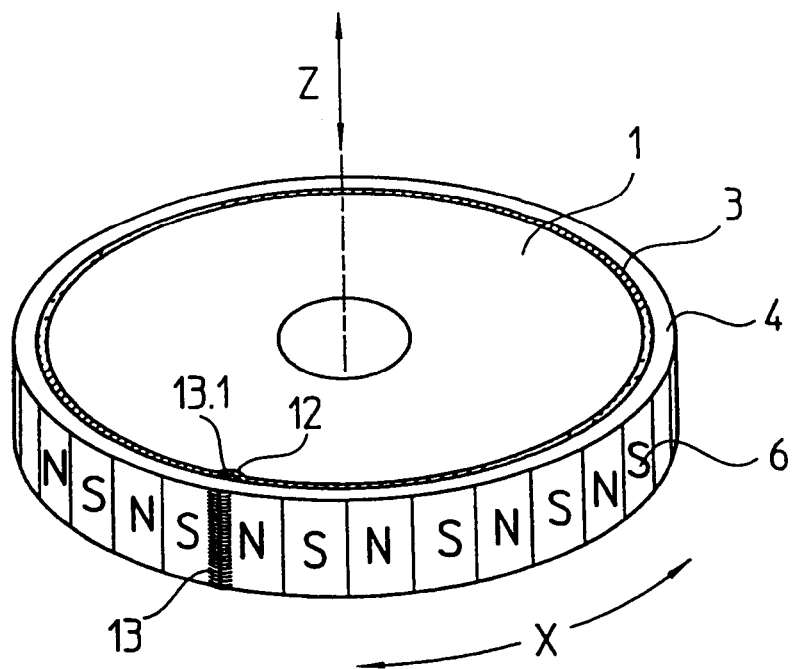
FIG. 5 is a perspective view showing a fourth embodiment of the measuring standard.

Ring 4 of a permanent magnetic alloy, for example, can be a prefabricated molded article, whose profile is created through hot or cold working. Ring 4 can also be produced as a strip formed from a cold-workable permanent magnetic material. The band is then bent to form ring 4, and the ends are welded together at the joint. A prefabricated ring 4 of this kind is shown in FIG. 5. The welding produces a bulge 13.1 at the welded connection 13. This bulge 13.1 can be reduced or removed through milling or machine-grinding. To ensure that what is left of bulge 13.1, following the milling or machine-grinding, does not cause any eccentricity in the outer peripheral surface of ring 4, a recess 12 is formed in peripheral surface 1.1 of base member 1 to accommodate this bulge 13.1.

In accordance with FIG. 5, weld 13, bulge 13.1, and depression 12 run in axial direction Z. Homogenous ring 4 can then be formed by the gap-free joining and subsequent welding of the band.

The present invention renders possible the simple joining of drum-shaped base member 1 and ring 4 over a large surface area. This joining over a large surface area ensures the suitability for high-speed operation of the assembly. Magnetizable material 4 enters into an intimate connection with base member 1, so that it is neither totally nor partially detachable.

To optimize the connection, the materials of base member 1, of solder 3, and of ring 4 are advantageously matched to produce not only an intimate mechanical connection, due to the surface bond produced on both boundary surfaces 1.1 and 4.1, but also a connection through diffusion or alloy formation. In this context, diffusion means that one or more material components of solder 3 diffuse into the material of parts 1 and 4 to be joined.

Ring 4 can be made of a permanent magnetic alloy, for example an alloy having a chromium, cobalt and iron base. This material is also described as CROVAC. Base member 1 is made of stainless steel. The material combination that makes up the solder includes silver, copper, and other constituents, such as cadmium and/or nickel, and/or zinc, and/or silver, and/or manganese, and/or tin. In place of the soldering material having a silver or copper base, solder having a nickel, cobalt, copper, or gold base can also be used.

For operation at especially high speeds, a base member 1 made of titanium or at least substantially, of an alloy containing the component titanium is desirable. In this context, solder 3 should contain the material component copper, enabling it to form an intimate bond with the titanium of base member 1 through diffusion, or alloy formation. Solder 3 may also contain additional titanium instead of copper, to form a stronger bond with the titanium base member 1.

The soldering operation can be carried out in a protective gas atmosphere, a process gas, a vacuum, or in a normal atmosphere. Furthermore, all known heating methods can be utilized. The solder can be used in a powdery form, as a paste, and as a molding material shaped, for example, as a ring or as a foil.

In summary, the following benefits are derived from the measuring standard according to the present invention. A high mechanical strength is obtained for the entire measuring standard, making it suitable for very high rotational speeds of over 20,000 rpm, which are common in high-speed machine-tool spindles. As a result, there are minimal deformations of the measuring standard in response to mechanical stress. The standard also has a high resistance to chemical attacks, such as by solvents, and substantial thermal loading capacity is achieved. The components of the standard can be produced with relatively large manufacturing tolerances.

The magnetic pattern 6 formed on ring 4 can be a single- or multi-track incremental division running in the circumferential direction X, or can be a single- or multi-track absolute code division running in the circumferential direction X.

Figure 6:
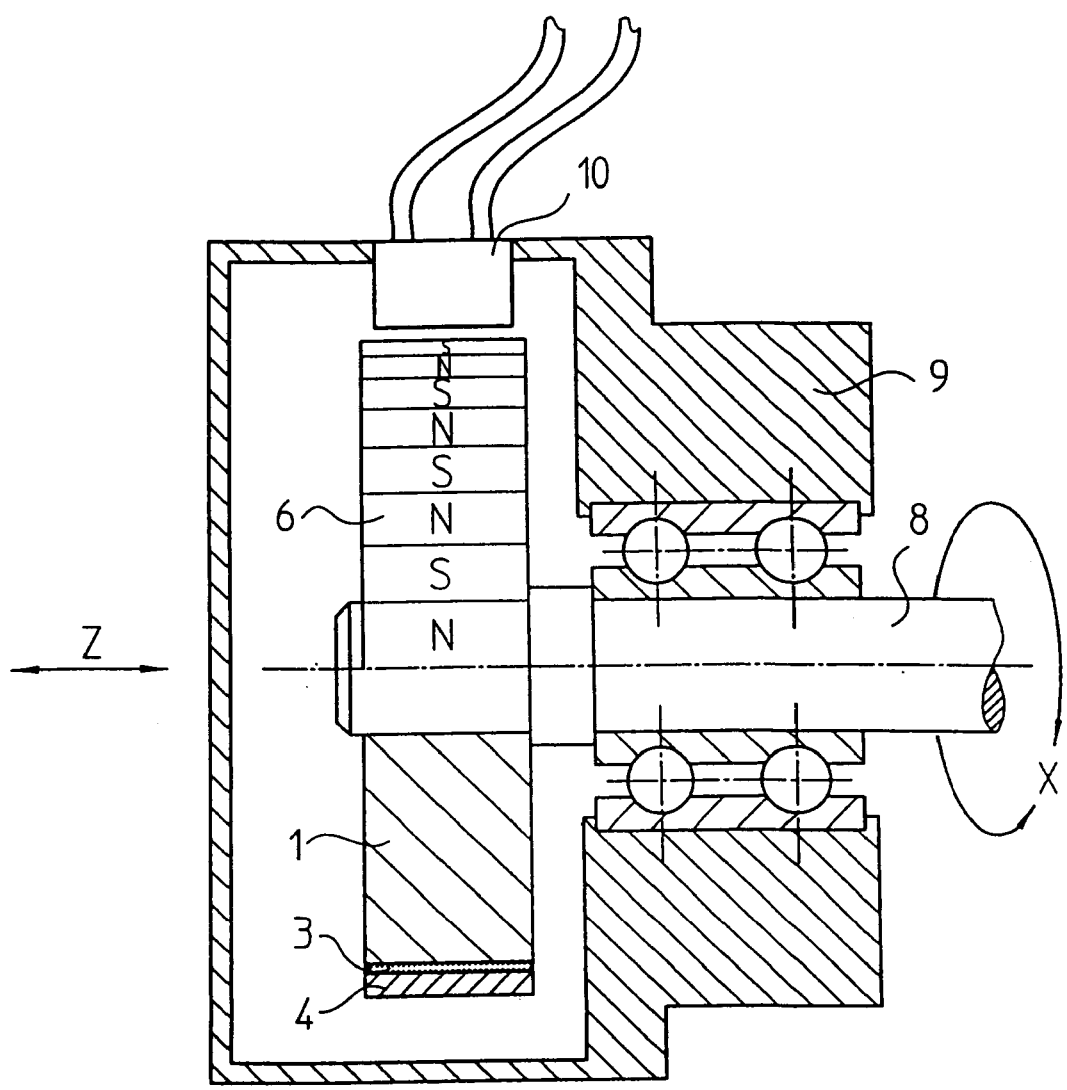
FIG. 6 is a cross sectional view of an angular position measuring device having a measuring standard in accordance with FIG. 2.

FIG. 6 shows one especially advantageous application of a measuring standard produced in accordance with the present invention. The measuring standard having magnetic divisions 6 is connected to base member 1 and to soldered-on ring 4, which is mounted on a shaft 8. Shaft 8, in turn, is rotationally mounted on a stator 9. A generally known magnetic field-sensitive scanning unit 10 is secured to stator 9. Unit 10 scans the magnetic divisions 6 and produces electrical, positionally dependent sampled signals corresponding to the rotation speed of ring 4.

Shaft 8 can, for example, also be directly formed by the spindle of a machine-tool. In this context, graduation-scale carrier ring 4 can be made of a permanent magnetic alloy of AL Ni Co, or can have a cobalt, iron and vanadium base. In addition, rare-earth permanent magnetic alloys and magnetically hard ceramics, such as Ne Fe B or Sm Co, can be used.

To obtain an especially stable bond, the hard-solder method of soldering should be used. In this method, one applies a solder, for example one having a high silver content, that has a higher melting temperature then the type of solder used in soft soldering. This measure increases the potential operating temperature of the measuring standard. Furthermore, there is an even greater improvement in the tensile strength achieved during soldering if the hard soldering method is used.

To optimize the magnetic properties, the magnetic material 4 is subject to a thermal treatment either in a magnetic field or without a magnetic field being present, in a conventional manner. An advantage of the method of the present invention is that this treatment can also be performed during the soldering operation. For example, during the thermal treatment caused by soldering, magnetic material 4 is subject to a magnetic field having the desired direction. In the case of ring 4 of the drum-shaped measuring standard, the magnetic field should act in the circumferential direction (measuring direction X), so that the elementary magnets of magnetic material 4 orient themselves in the circumferential direction, which is also the measuring direction. The external magnetic field required for this process can be produced by permanent magnets or by coils.

According to this system, the anisotropic properties of magnetic material 4 can be adjusted during soldering. Alternatively, an external magnetic field can also be applied perpendicularly to measuring direction X, so that the elementary magnets orient themselves perpendicularly, in a direction normal to measuring direction X.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A measuring standard comprising:
   a drum-shaped base member;
   a prefabricated closed ring of a magnetic material having an inner surface area secured to a periphery of the base member by soldering, wherein a soldering material is introduced between the base member and the prefabricated ring; and
   a magnetic pattern arranged on a circular peripheral area of the ring, disposed opposite the soldered inner surface, having a series of alternating portions extending in the circumferential direction of the ring and whose magnetization differs on a portion by portion basis.

2. The measuring standard as recited in claim 1, wherein the prefabricated ring is formed by bending an element having ends so that the ends meet, and welding the ends, wherein the element is a magnetic material.

3. The measuring standard as recited in claim 1, wherein the prefabricated ring is a molded permanent magnetic alloy.

4. The measuring standard as recited in claim 1, wherein the soldering material contains a material constituent adapted for diffusing into the periphery of the base member during soldering.

5. The measuring standard as recited in claim 1, wherein the prefabricated ring is a permanent magnetic alloy ring containing cobalt.

6. The measuring standard as recited in claim 1, wherein the soldering material contains at least nickel.

7. The measuring standard as recited in claim 1, wherein the soldering material contains at least silver.

8. The measuring standard as recited in claim 1, wherein the base member is made of steel.

9. The measuring standard as recited in claim 1, wherein the base member is made of an alloy containing titanium, and the soldering material contains at least one of titanium and copper.

10. A measuring standard comprising:
    a drum-shaped base member;
    a prefabricated ring of a magnetic material having an inner surface area secured to a periphery of the base member by soldering, wherein a soldering material is introduced between the base member and the prefabricated ring; and a magnetic pattern arranged on a circular peripheral area of the ring, disposed opposite the soldered inner surface, having a series of alternating portions extending in the circumferential direction of the ring and whose magnetization differs on a portion by portion basis;

wherein the prefabricated ring is a band-shaped element formed from a bent and welded magnetic material; and wherein the base member comprises a groove formed on the periphery of the base member, adapted for accommodating a bulge formed by welding the magnetic material.

11. A measuring standard comprising:

a drum-shaped base member;

a prefabricated ring of a magnetic material having an inner surface area secured to a periphery of the base member by soldering, wherein a soldering material is introduced between the base member and the prefabricated ring; and a magnetic pattern arranged on a circular peripheral area of the ring, disposed opposite the soldered inner surface, having a series of alternating portions extending in the circumferential direction of the ring and whose magnetization differs on a portion by portion basis;

wherein at least one of the base member and the prefabricated ring have an at least partially circumferentially disposed chamfer, so that the at least partially circumferentially disposed chamfer and at least one of the base member and the prefabricated ring, cooperate to form at least one pocket adapted for receiving the soldering material.

12. A positional measuring device comprising:

a drum-shaped base member;

a prefabricated closed ring having an inner surface area secured to a periphery of the base member by soldering, wherein a soldering material is introduced between the base member and the prefabricated ring;

a magnetic pattern arranged on a circular peripheral area of the ring, disposed opposite the soldered inner surface, having a series of alternating portions extending in the circumferential direction of the ring and whose magnetization differs on a portion by portion basis; and a magnetic field-sensitive scanning unit adjacent to the magnetic pattern, to scan the magnetic pattern and generate at least one electrical, positionally dependent sampled signal as a function of an instantaneous angular position of the base member.

13. A measuring standard comprising:

a drum-shaped base member;

a prefabricated closed ring of a magnetic material having an inner surface area secured to a periphery of the base member by soldering, wherein a soldering material is introduced between the base member and the prefabricated ring;

a magnetic pattern arranged on a circular peripheral area of the ring, disposed opposite the soldered inner surface, having a series of alternating portions extending in the circumferential direction of the ring and whose magnetization differs on a portion by portion basis; and grooves disposed on at least one of the periphery of the base member and the inner surface of the prefabricated ring.

14. A measuring standard comprising:

a drum-shaped base member;

a prefabricated ring of a magnetic material having an inner surface area secured to a periphery of the base member by soldering, wherein a soldering material is introduced between the base member and the prefabricated ring;

a magnetic pattern arranged on a circular peripheral area of the ring, disposed opposite the soldered inner surface, having a series of alternating portions extending in the circumferential direction of the ring and whose magnetization differs on a portion by portion basis; and grooves disposed on at least one of the periphery of the base member and the inner surface of the prefabricated ring;

wherein the grooves are spiral shaped.

15. A method for producing a measuring standard comprising the steps of:

forming a closed ring from an element made from a magnetic material by welding together the ends of the element;

sliding the ring onto the outer surface of a drum-shaped base member;

soldering the ring onto the outer surface of the base member by introducing soldering material between the base member and an inner peripheral surface of the ring; and applying a magnetic pattern in a circumferential direction of the ring on an outer peripheral surface of the ring.

16. A method for producing a measuring standard, comprising the steps of:

welding together ends of an element made of a magnetic material to form a closed ring;

providing one of a chamfer, spaced chamfered sections and a plurality of grooves on a drum-shaped base member, the one of the chamfer, the spaced chamfered sections and the plurality of grooves configured to receive a bead of solder;

sliding the ring onto an outer surface of the drum-shaped base member;

soldering the ring onto the outer surface of the base member by introducing soldering material between the outer surface of the base member and an inner peripheral surface of the ring; and applying a magnetic pattern in a circumferential direction of the ring on an outer peripheral surface of the ring.

17. The method according to claim 16, wherein the soldering step includes the substep of depositing solder in the form of a ring.

18. The method according to claim 16, wherein the sliding step includes the substep of axially displacing the ring relative to the base member.

19. The method according to claim 16, wherein the soldering step includes the substep of fully wetting the inner peripheral surface of the ring and the outer surface of the base member with liquid solder.

20. The method according to claim 16, wherein the spaced chamfered sections are provided in the providing step along an upper circumferential edge of the base member.

21. The method according to claim 16, wherein the grooves provided in the providing step are spaced circumferentially around the base member.

22. The method according to claim 16, wherein the soldering step includes the substep of heating the base member, the ring and the soldering material in a heating oven.

23. The method according to claim 16, further comprising the step of providing one of a chamfer and a groove on the ring.

24. The method according to claim 16, wherein the applying step includes the substep of alternatively magnetizing the magnetic material by a write head.

25. The method according to claim 16, wherein the sliding step is performed during the soldering step.

26. The method according to claim 16, wherein the sliding step is performed subsequent to the soldering step.

27. The method according to claim 16, wherein the sliding step is performed prior to the soldering step.

28. The method according to claim 27, wherein the soldering step includes the substep of applying the soldering material to a periphery of the base member and then melting the soldering material.

29. The method according to claim 28, wherein the soldering material applying step includes the substep of one of coiling the soldering material as a foil around the periphery of the base member and applying the soldering material as a paste.

30. The method according to claim 16, wherein the grooves include spiral-shaped grooves.

31. The method according to claim 16, wherein the magnetic material includes a permanent magnetic alloy.

32. The method according to claim 31, wherein the alloy includes a chromium, cobalt and iron base.

33. The method according to claim 31, wherein the alloy includes cobalt.

34. The method according to claim 16, further comprising the step of forming a groove on a periphery of the base member configured to accommodate a bulge formed by the welding step.

35. The method according to claim 16, wherein the soldering material includes a material constituent configured to diffuse into a periphery of the base member during the soldering step.

36. The method according to claim 16, wherein the soldering material includes at least one of nickel and silver.

37. The method according to claim 16, wherein the base member includes steel.

38. The method according to claim 16, wherein the base member includes an alloy containing titanium and the soldering material includes at least one of titanium and copper.

39. The method according to claim 16, wherein the soldering step is performed in one of a protective gas atmosphere, a process gas, a vacuum and a normal atmosphere.

40. A measuring standard comprising:
   a drum-shaped base member;
   a prefabricated closed ring of a magnetic material having an inner surface area secured to a periphery of the base member by soldering, wherein a soldering material is introduced between the base member and the prefabricated closed ring; and
   a magnetic pattern arranged on a circular peripheral area of the closed ring, disposed opposite the soldered inner surface, having a series of alternating portions extending in the circumferential direction of the closed ring and whose magnetization differs on a portion by portion basis,
   wherein the drum-shaped base member having one of a chamfer, spaced chamfered sections and a plurality of grooves on a drum-shaped base member, the one of the chamfer, the spaced chamfered sections and the plurality of grooves configured to receive a bead of solder.

41. A measuring standard comprising:
   a drum-shaped base member;
   a prefabricated closed ring of a magnetic material having an inner surface area secured to a periphery of the base member by soldering, wherein a soldering material is introduced between the base member and the prefabricated closed ring; and
   a magnetic pattern arranged on a circular peripheral area of the closed ring, disposed opposite the soldered inner surface, having a series of alternating portions extending in the circumferential direction of the closed ring and whose magnetization differs on a portion by portion basis,
   wherein the drum-shaped base member having one of a chamfer, spaced chamfered sections and a plurality of grooves on a drum-shaped base member, the one of the chamfer, the spaced chamfered sections and the plurality of grooves configured to receive a bead of solder,
   wherein the base member is made of steel, and
   wherein the magnetic material includes a permanent magnetic alloy including at least one of a chromium, cobalt and iron base.

42. A method for producing a measuring standard comprising the steps of:
   (a) sliding a closed ring made from a magnetic material onto an outer surface of a drum-shaped base member, wherein the drum-shaped base member having one of a chamfer, spaced chamfered sections and a plurality of grooves on a drum-shaped base member, the one of the chamfer, the spaced chamfered sections and the plurality of grooves configured to receive a bead of solder;
   (b) soldering the closed ring onto the outer surface of the base member by introducing soldering material between the base member and an inner peripheral surface of the closed ring; and
   (c) applying a magnetic pattern in a circumferential direction of the closed ring on an outer peripheral surface of the closed ring.

43. A measuring standard comprising:
   a drum-shaped base member;
   a prefabricated closed ring of a magnetic material having an inner surface area secured to a periphery of the base member by soldering, wherein a soldering material is introduced between the base member and the prefabricated closed ring; and
   a magnetic pattern arranged on a circular peripheral area of the closed ring, disposed opposite the soldered inner surface, having a series of alternating portions extending in the circumferential direction of the closed ring and whose magnetization differs on a portion by portion basis,
   wherein the base member is made of steel, and
   wherein the magnetic material includes a permanent magnetic alloy including at least one of a chromium, cobalt and iron base.

44. A method for producing a measuring standard comprising the steps of:
   (a) sliding a closed ring made from a magnetic material onto an outer surface of a drum-shaped base member,
   (b) soldering the closed ring onto the outer surface of the base member by introducing soldering material between the base member and an inner peripheral surface of the closed ring; and
   (c) applying a magnetic pattern in a circumferential direction of the closed ring on an outer peripheral surface of the closed ring.

* * * * *